United States Patent
Lin et al.

(10) Patent No.: US 7,061,755 B2
(45) Date of Patent: Jun. 13, 2006

(54) COMPUTER ENCLOSURE WITH LATCH DEVICE

(75) Inventors: Kuo-Chih Lin, Tu-Chen (TW); Li-Peng Chen, Tu-Chen (TW); Chen-Lu Fan, Tu-Chen (TW)

(73) Assignees: Hon Fu Jin Precision Ind. (Shenzhen) Co., Ltd., Shenzhen (CN); Hon Hai Precision Ind. Co., Ltd., Taipei Hsien (TW)

( * ) Notice: Subject to any disclaimer, the term of this patent is extended or adjusted under 35 U.S.C. 154(b) by 129 days.

(21) Appl. No.: 10/894,745

(22) Filed: Jul. 19, 2004

(65) Prior Publication Data
US 2005/0013105 A1 Jan. 20, 2005

(30) Foreign Application Priority Data
Jul. 19, 2003 (CN) .......................... 03 2 67855 U

(51) Int. Cl.
*G06F 1/16* (2006.01)
(52) U.S. Cl. ...................................... 361/683; 361/679
(58) Field of Classification Search ................ 361/679, 361/683
See application file for complete search history.

(56) References Cited

U.S. PATENT DOCUMENTS

| | | | | |
|---|---|---|---|---|
| 5,917,696 A | * | 6/1999 | Peng ........................... | 361/686 |
| 5,967,633 A | * | 10/1999 | Jung ........................ | 312/223.2 |
| 6,327,151 B1 | * | 12/2001 | Chen et al. .................. | 361/726 |
| 6,373,692 B1 | * | 4/2002 | Cheng ........................ | 361/683 |

FOREIGN PATENT DOCUMENTS

TW 386613 4/1990

\* cited by examiner

*Primary Examiner*—Yean-Hsi Chang

(57) ABSTRACT

A computer enclosure includes a cage (10), a side panel (11) and a latch device (30) for securing the side panel to the cage. The cage includes a cutout (52) and a plurality of slits (26), the side panel includes a receiving portion (42) and a plurality of catches (12) for engaging in the slits. The latch device received in the receiving portion includes a cover (32), a base (34) combined with the cover, a handle (36) and a locking mechanism (38) placed in the base. The locking mechanism includes a pair of levers (70) and a resilient arm (80) connecting the levers. When the handle is pressed to deform the resilient arm, the levers are retracted towards each other, so that distal ends of the levers are in alignment with the cutout, the side panel is thus detachable from the cage.

22 Claims, 4 Drawing Sheets

COMPUTER ENCLOSURE WITH LATCH DEVICE

BACKGROUND OF THE ENTION

1. Field of the Invention

The present invention relates to computer enclosures, and in particularly to a computer enclosure having a latch device for readily securing a side panel to the computer enclosure and detaching the side panel therefrom.

2. Related Art

Many different means are used to secure side panels to computer enclosures. One conventional means is simply to secure a side panel directly to a computer enclosure with screws. However, this requires a screwdriver. Installation and removal of the side panel is unduly cumbersome and time-consuming.

As computers have proliferated and improved, various fastening means have been developed to facilitate installation and removal of side panels. One fastening means is shown in Taiwan Patent Application No. 87213422. Locking means thereof comprises a plurality of hooks inwardly formed from a flange of one side of a side panel of a computer enclosure, for engaging in corresponding slots in a rear panel of the computer enclosure. An opposite side of the side panel forms an L-shaped flange. A plurality of apertures is defined in the L-shaped flange, for extension of screws thereinto. Because screws are needed to fix the side panel to the computer casing, installation and removal of the side panel is still unduly cumbersome and time-consuming.

An improved fastening device for securing a side panel to a computer enclosure which overcomes the above-mentioned problems is desired.

SUMMARY OF THE INVENTION

Accordingly, an object of the present invention is to provide a computer enclosure having a latch device for readily securing a side panel to the computer enclosure and readily detaching the side panel therefrom.

To achieve the above-mentioned object, a computer enclosure of present invention comprises a cage, a side panel and a latch device for securing the side panel to the cage. The cage comprises a cutout and a plurality of slits, the side panel comprises a receiving portion and a plurality of catches for engaging in the slits. The latch device received in the receiving portion includes a cover, a base combined with the cover, a handle and a locking mechanism placed in the base. The locking mechanism includes a pair of levers and a resilient arm connecting the levers. When the handle is pressed to deform the resilient arm, the levers are retracted towards each other, so that distal ends of the levers are in alignment with the cutout, the side panel is thus detachable from the cage.

Other objects, advantages and novel features of the present invention will be drawn from the following detailed description of a preferred embodiment of the present invention with attached drawings, in which:

DESCRIPTION OF THE PREFERRED EMBODIMENT

Figure 1:
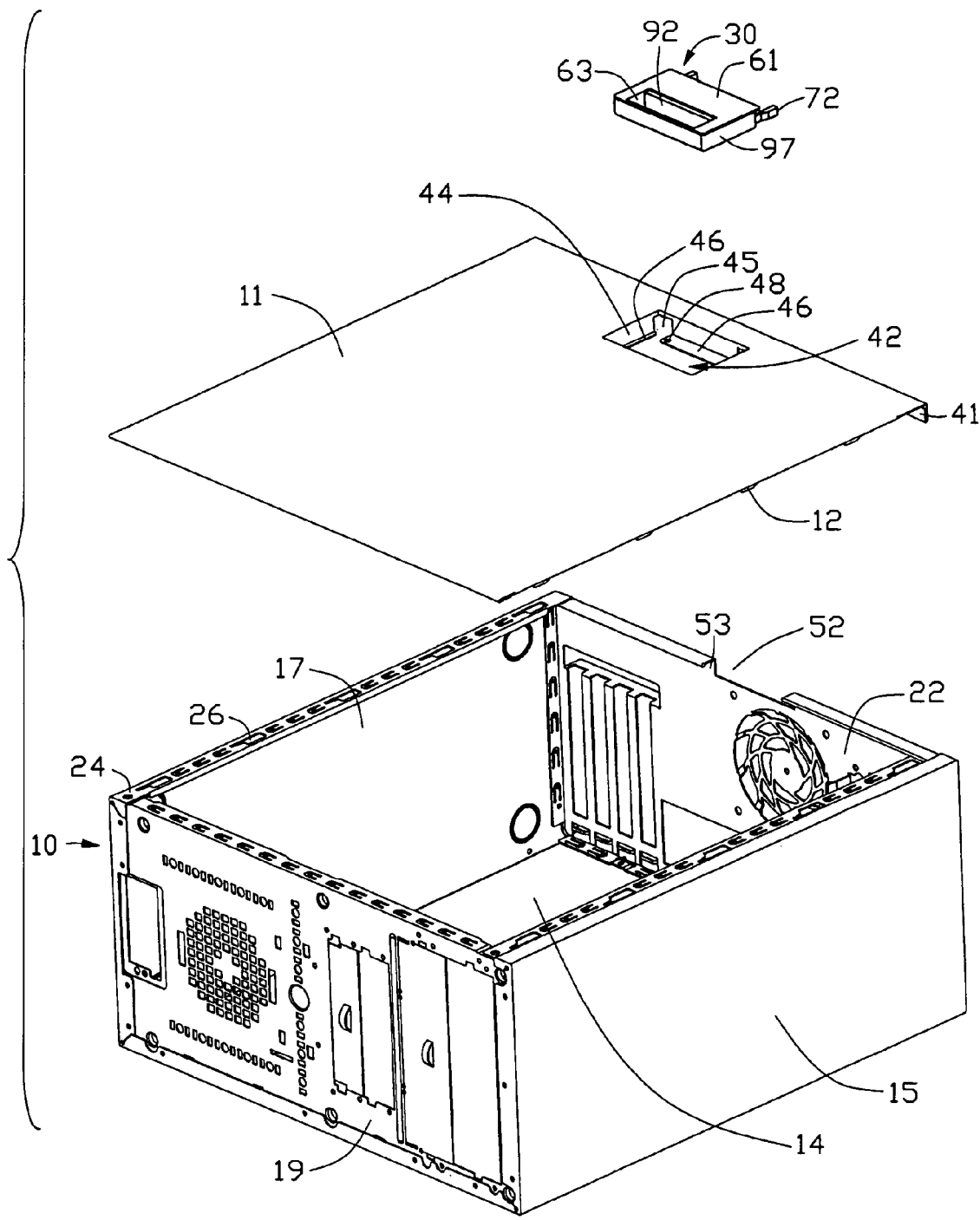
FIG. 1 is an exploded, isometric view of a computer enclosure in accordance with the present invention, the computer enclosure comprises a cage, a side panel and a latch device.

Referring to FIG. 1, a computer enclosure of the present invention comprises a cage 10, a side panel 11, and a latch device 30.

The cage 10 comprises a side wall 14, a top wall 15, a bottom wall 17, a front wall 19 and a rear wall 22. A flange 24 extends inwardly from each of the front wall 19, the top wall 15 and the bottom wall 17. A plurality of slits 26 is defined in the flanges 24. A cutout 52 is defined in an edge of the rear wall 22 corresponding to the latch device 30. Two stop portions 53 are defined at two opposite sides of the cutout 52.

A plurality of catches 12 extends perpendicularly inwardly from edges of the side panel 11, for engaging in the corresponding slits 26 of the flanges 24 of the cage 10. A receiving portion 42 is defined in rear portion of the side panel 11, with a predetermined distance from a rear edge 41 of the side panel 11. The receiving portion 42 is generally rectangular, with four side plates 44 extending perpendicularly inwardly from four edges thereof respectively. A pair of notch 45 is defined in opposite sides of the side plate 44 which is nearest to the rear edge 41. A wing 46 extends horizontally inwardly from a bottom edge of each side plate 44. A pair of through holes 48 is defined in both ends of the wing 46 nearest to the rear edge 41 of the side panel 11.

Figure 2:
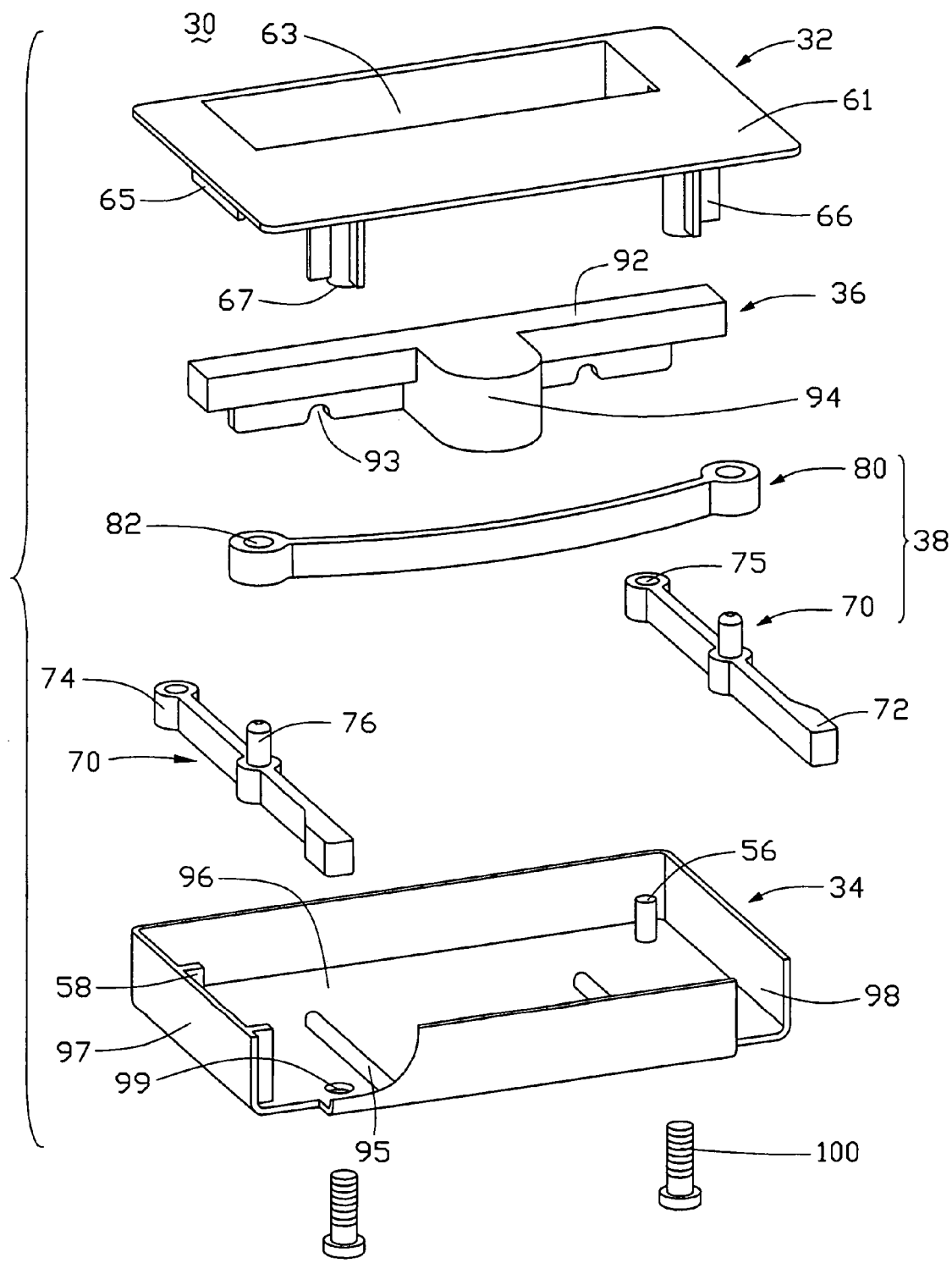
FIG. 2 is an exploded, isometric view of the latch device of FIG. 1.

Referring also to FIG. 2, the latch device 30 contained in the receiving portion 42 comprises an cover 32, an base 34 combined with the cover 32, a handle 36, and a locking mechanism 38.

The cover 32 comprises a rectangular main body 61. A slot 63 is formed in one side of the cover 32. Three guiding plates 65 extend perpendicularly inwardly from three edges of the slot 63. A pair of posts 66 protrudes from opposite ends of the cover 32, respectively. A screw hole 67 is defined in each post 66.

The handle 36 located under the slot 63 comprises a long pressing portion 92. A pair of sliding grooves 93 is defined in a bottom of the pressing portion 92. An operating protrusion 94 extends sidewardly from a middle of the pressing portion 92.

The base 34 is generally rectangular corresponding the cover 32. The base 34 comprises a rectangular main body 96. A stop wall 97 extends from each edge of the main body 96. The adjacent three stop walls 97 corresponding to the three guiding plates 65 are connected with each other. The fourth stop wall 97 is apart from the others, so that a notch 98 is formed between each end of the fourth stop wall 97 and the neighboring stop wall 97, corresponding to the notch 45 of the side panel 11. A pair of spaced ribs 58 protrudes from the stop wall 97. A pair of guiding bars 95 is formed on the inner bottom of the main body 96 corresponding to the sliding grooves 93 of the handle 36. A pair of posts 56 extends perpendicularly upwardly from opposite corners of the main body 96 which are away from the fourth stop wall 97. A pair of through holes 99 is defined in the main body 96 corresponding to the through holes 48 of the receiving portion 42 respectively.

The locking mechanism 38 comprises a pair of levers 70 and a resilient arm 80 engaging with the levers 70. An operation head 72 is formed on one end of each lever 70, and a fastening portion 74 is formed on the other end. A shaft 76 extends upwardly from approximately a middle of the lever 70. A pivot hole 75 is defined in the fastening portion 74, for pivotally engaging with the post 56 of the base 34. The resilient arm 80 is curvulate. A pivot hole 82 is defined in each end of the resilient arm 80, for pivotally receiving the shaft 76 of the lever 70.

Referring also to FIGS. 2–5, in assembling the locking mechanism 38, the shafts 76 of the levers 70 are pivotally received in the pivot holes 82 of the resilient arm 80.

In assembling the latch device 30, the posts 56 of the base 34 are received in the pivot holes 82 of the levers 70. The operation heads 72 of the levers 70 extend through the corresponding notch 98. The handle 36 is placed in the base 34 adjacent to the resilient arm 80. The pressing portion 92 of the handle 36 is located between the ribs 58 of the base 34, so that the handle 36 is restricted in its movement. Meanwhile, the guiding bar 95 of the base 34 is received in the sliding groove 93 of the handle 36. Thus the handle 36 can slide along the guiding bar 95. The cover 32 covers the base 34.

Figure 3:
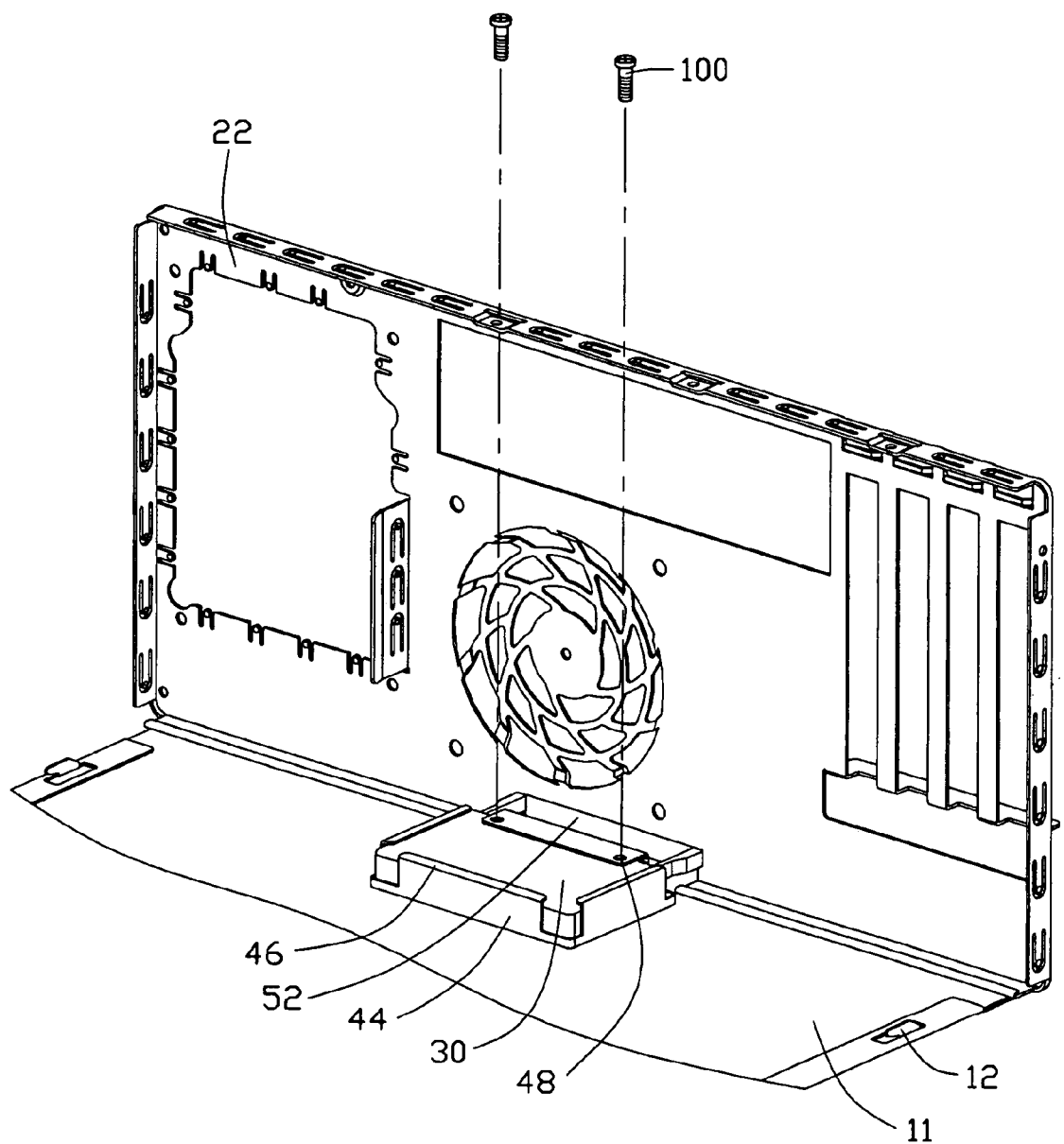
FIG. 3 is an assembled view of FIG. 1, but viewed from another aspect and with the cage being partly cut away.

Referring also to FIG. 3, the assembled latch device 30 is placed into the receiving portion 42 of the side panel 11 from an outer side. The latch device 30 is supported and restricted by the side plate 44 and the wing 46 of the receiving portion 42. A screw 100 extends through the corresponding through hole 99, through hole 48 and engages in the screw hole 67 of the pole 66. The assembled latch device 30 is thus mounted to the side panel 11.

In assembling the side panel 11, the catches 12 of the side panel 11 are engaged in the corresponding splits 26 of the cage 10. The side panel 11 is pushed forward. The operation heads 72 are forced to cross the cutout 52 of the rear wall 22 and then abut against the stop portions 53. The side panel 11 cannot slide backwardly so that it is secured to the cage 10.

Figure 4:
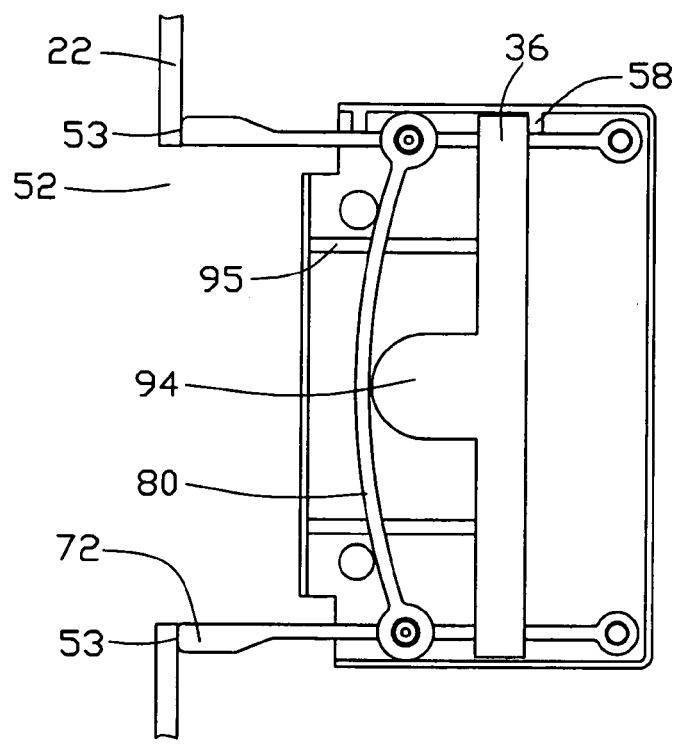
FIG. 4 is an assembled view of FIG. 2, but viewed from another aspect.
Figure 5:
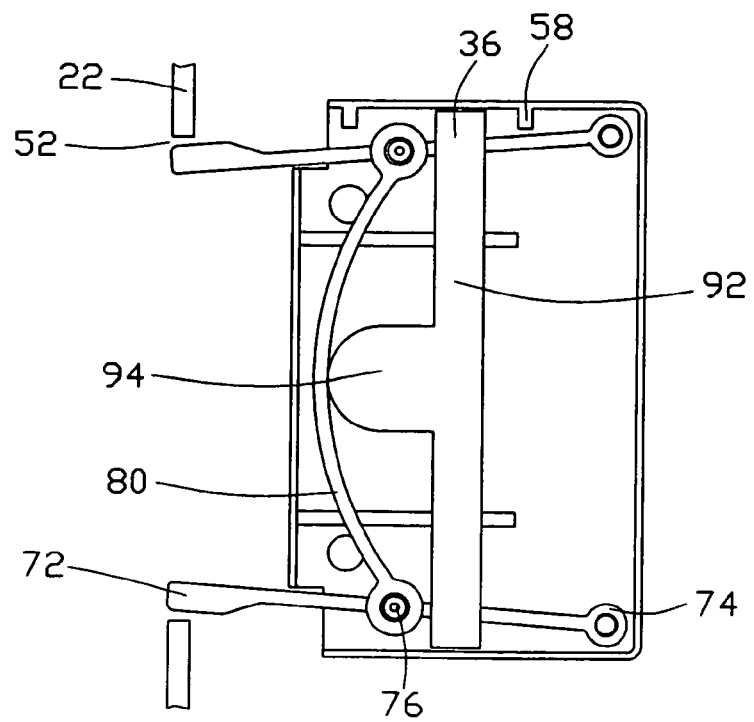
FIG. 5 is similar to FIG. 5, but showing the latch device in an unlocked state.

Referring also to FIG. 4, in disassembling the side panel 11, the handle 36 is pushed. The operation portion 94 of the handle 36 presses the resilient arm 80. The resilient arm 80 is forced to curve, and the levers 70 contract toward each other. The operation heads 72 of the levers 70 are released from the corresponding stop portions 53 of the rear wall 22 and align with the cutout 52. Then, the side panel 11 is able to be pushed rearwardly, the catches 12 of the side panel 11 are disengaged from the slits 26 of the cage 10. The side panel 11 is then removed from the cage 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to full extent indicated by the broad general meaning of the terms in which the appended claims are expressed.

The invention claimed is:

1. A computer enclosure comprising:
a cage comprising a rear wall with a cutout defined therein;
a side panel attached to the cage, a receiving portion formed in the side panel; and
a latch device received in the receiving portion, the latch device comprising a base, and a locking mechanism received in the base, the locking mechanism comprising a pair of levers and a resilient arm connecting the levers, each of the levers having one end connecting with the base, and the other end protruding out of the base; wherein
when the side panel is attached to the cage, the other end of each of the levers abuts against the rear wall at opposite sides of the cutout; when the resilient arm is deformed, the levers are retracted towards each other by the resilient arm, so that the other end of each of the levers is in alignment with the cutout, the side panel is thus detachable from the cage.

2. The computer enclosure as described in claim 1, wherein the latch device further comprises a handle movably placed adjacent the resilient arm, the handle comprises a pressing portion and an operating protrusion extends sidewardly from the pressing portion.

3. The computer enclosure as described in claim 2, wherein the base comprises a pair of ribs protrudes from one sidewall thereof for restricting movements of the handle.

4. The computer enclosure as described in claim 2, wherein a pair of sliding grooves is defined in a bottom of the pressing portion, a pair of guiding bars is formed on a bottom plate of the base corresponding to the sliding grooves.

5. The computer enclosure as described in claim 1, wherein a pair of posts extends upwardly from opposite corners of a front side of the base, said one end of each of the levers defines a pivot hole to receive a corresponding post.

6. The computer enclosure as described in claim 1, wherein a shaft extends upwardly from approximately a middle of each of the levers, a pivot hole is defined in each end of the resilient arm for pivotally receiving the shaft.

7. The computer enclosure as described in claim 1, wherein the latch device further comprises a cover combined with the base, a slot is defined in the cover for accessing the handle.

8. The computer enclosure as described in claim 7, wherein a pair of posts with screw holes protrudes from the cover, a pair of through holes is defined in a bottom of the receiving portion, a pair of through holes is defined in the base, a pair of screws extends through the through holes of the receiving portion and the base, and engages in the screw holes.

9. The computer enclosure as described in claim 8, wherein the receiving portion comprises four side plates extending inwardly from four edges thereof respectively, a pair of notches is defined in opposite sides of a rear one of the side plates for said other ends of the levers extending therethrough.

10. The computer enclosure as described in claim 1, wherein the cage further comprises a top wall and a bottom wall, each of which forms a flange, a plurality of slits is formed in the flange, a plurality of catches is formed from lower and upper sides of the side panel for engaging with the slits.

11. A computer enclosure comprising:
a cage comprising a top wall, a bottom wall and a rear wall, a plurality of slits defined in an edge of each of the top wall and the bottom wall, and a cutout defined in the rear wall;
a side panel attached to the cage, a receiving portion formed in the side panel, and a plurality of catches extending inwardly from edges of the side panel; and
a latch device received in the receiving portion, the latch device comprising a base, and a locking mechanism received in the base, the locking mechanism comprising a pair of levers and a resilient arm connecting the levers, each of the levers having one end connecting with the base, and the other end protruding out of the base; wherein when the side panel is attached to the cage, the catches of the side panel engage in the slits of the cage to prevent the side panel from moving in a first direction, said other end of each of the levers abuts against the rear wall at opposite sides of the cutout so as to prevent the side panel from moving in a second direction opposite to the first direction; when the resilient arm is deformed, the levers are retracted towards each other by the resilient arm, so that the other end of each of the levers is in alignment with the cutout, the side panel is able to move in the second direction, and whereby the catches disengage with the slits.

12. The computer enclosure as described in claim 11, wherein the latch device further comprises a handle movably placed adjacent the resilient arm, the handle comprises a pressing portion and an operating protrusion extends sidewardly from the pressing portion.

13. The computer enclosure as described in claim 12, wherein the base comprises a pair of ribs protrudes from one sidewall thereof for restricting movements of the handle.

14. The computer enclosure as described in claim 12, wherein a pair of sliding grooves is defined in a bottom of the pressing portion, a pair of guiding bars is formed on a bottom plate of the base corresponding to the sliding grooves.

15. The computer enclosure as described in claim 12, wherein a pair of posts extends upwardly from opposite corners of a front side of the base, said one end of each of the levers defines a pivot hole to receive a corresponding post.

16. The computer enclosure as described in claim 12, wherein the latch device further comprises a cover combined with the base, a slot is defined in the cover for accessing the handle.

17. The computer enclosure as described in claim 16, wherein a pair of posts with screw holes protrudes from the cover, a pair of through holes is defined in a bottom of the receiving portion, a pair of through holes is defined in the base, a pair of screws extends through the through holes of the receiving portion and the base, and engages in the screw holes.

18. The computer enclosure as described in claim 17, wherein the receiving portion comprises four side plates extending inwardly from four edges thereof respectively, a pair of notches is defined in opposite sides of a rear one of the side plates for said other ends of the levers extending therethrough 19. The computer enclosure as described in claim 11, wherein a shaft extends upwardly from approximately a middle of each of the levers, a pivot hole is defined in each end of the resilient arm for pivotally receiving the shaft.

20. A computer enclosure comprising:
a cage comprising a rear wall with a cutout defined therein;
a side panel attached to the cage, a receiving portion formed in the side panel; and
a latch device received in the receiving portion, the latch device comprising a base, and a locking mechanism received in the base, the locking mechanism comprising a lever with a head at a rear end, and a handle actuating said lever; wherein when the side panel is attached to the cage, the head abuts against the rear wall in a front-to-back direction around said cutout; when the handle is moved along said front-to-back direction, said lever is forced to moved in another direction lateral to said front-to-back direction, so as to disengage the head from the rear wall and allow the head to enter the cutout, whereby the side panel is rearwardly moved relative to the cage for being disassembled from the cage.

21. The enclosure as described in claim 20, wherein said handled actuates a resilient arm which is connected to the lever to have the head move in said another direction.

22. The enclosure as described in claim 20, wherein said side panel defines a normal direction perpendicular thereto under a condition that both said front-to-back direction and said another direction are perpendicular to said normal direction.

* * * * *